United States Patent [19]

Janik et al.

[11] Patent Number: 4,899,596
[45] Date of Patent: Feb. 13, 1990

[54] SELF-CALIBRATING TORQUE MEASURING SYSTEM

[75] Inventors: Stanley Janik, Naugatuck; Kimball J. Rumford, Fairfield; Timothy Warner, Newtown, all of Conn.

[73] Assignee: Avco Corporation, Stratford, Conn.

[21] Appl. No.: 189,976

[22] Filed: May 4, 1988

[51] Int. Cl.4 .............................................. G01L 3/10
[52] U.S. Cl. ................................... 73/862.33; 73/1 C
[58] Field of Search ............... 73/862.33, 862.34, 1 C

[56] References Cited

U.S. PATENT DOCUMENTS

| | | |
|---|---|---|
| 3,548,649 | 12/1970 | Parkinson . |
| 3,572,106 | 3/1971 | Jonas . |
| 3,657,926 | 4/1972 | Munson et al. . |
| 3,797,305 | 3/1974 | Haskell . |
| 4,150,559 | 4/1979 | Levy . |
| 4,253,325 | 3/1981 | Reed et al. . |
| 4,444,063 | 4/1984 | Snowden et al. ............... 73/862.34 |
| 4,488,443 | 12/1984 | Parkinson . |
| 4,558,601 | 12/1985 | Stasiek et al. . |
| 4,567,377 | 1/1986 | Amlani et al. . |
| 4,583,411 | 4/1986 | Hales . |
| 4,602,515 | 7/1986 | Eichenlaub . |

*Primary Examiner*—Charles A. Ruehl
*Attorney, Agent, or Firm*—Perman & Green

[57] ABSTRACT

A universal torque measuring system for hollow drive shafts which automatically compensates for variations in wall thickness exhibited by different drive shafts having the same nominal dimensions. During a calibration procedure, the drive shaft is subjected to a first predetermined torque which causes a certain amount of twist dependent upon its wall thickness. At this time, target indicia are positioned and affixed to the drive shaft to produce an initial phase shift relative to indicia on a reference shaft. Thereafter, when the drive shaft is incorporated into an engine and rotated under load subjecting it to a second predetermined torque less than the first predetermined torque, there is a resulting second phase shift. This second phase shift and the second predetermined torque define a second operating condition of the drive shaft. In turn, the first and second operating conditions define a characteristic relationship between torque and phase shift for the drive shaft. A sensor is positioned to detect deviations in phase shift of the first and second target teeth from the initial phase shift and generates a signal proportional to such deviations. A microprocessor is responsive to the signal from the sensor for automatically deriving a value of torque being experienced by the drive shaft as a function of each such deviation according to the characteristic relationship.

20 Claims, 5 Drawing Sheets

TYPICAL TORQUEMETER CHARACTERISTIC

TORQUEMETER CHARACTERISTIC AT CONSTANT TEMPERATURE FOR VARIOUS SHAFTS

PRIOR ART

SELF-CALIBRATING TORQUE MEASURING SYSTEM

BACKGROUND OF THE INVENTION

1. Field of the Invention

The present invention relates generally to a system including method and apparatus for measuring the torque transmitted by a shaft and, in particular, a system which automatically compensates for variations in wall thickness exhibited by different drive shafts having the same nominal dimensions.

2. Description of the Prior Art

The present invention is particularly suited for use with monopole variable reluctance torque measuring apparatus of the type disclosed in U.S. Pat. Nos. 3,548,649 and 4,488,443, although its use need not be so restricted.

As disclosed in these earlier patents, the prior art has included various systems for measuring transmitted shaft torque by measuring the "twist" or torsional deflection of a length of the shaft while it is under a torsional load. Typically, a pair of toothed wheels are physically attached to spaced apart respective locations along the shaft and the relative displacement between the teeth of these two wheels is then detected by a suitable electrical signal transducer. For example, photo-electric or variable reluctance sensors may be utilized to detect the relative positions of teeth in the two toothed wheels.

In one monopole sensor embodiment, the toothed wheels are physically located substantially adjacent to one another although the relative rotational position of at least one of the wheels is determined by a tubular sleeve structure actually affixed to the shaft at some more significant distance away from the other wheel. In this way, sufficient shaft length is included so as to produce a desired magnitude of relative rotational movement between the toothed wheels when the shaft is torsionally loaded to a predetermined magnitude. In one such monopole sensor embodiment, the teeth are, at least in part, axially extended with the teeth on one wheel being interleaved between those on the other wheel and with a single pole variable reluctance sensor disposed to monitor the overlapped portions of such teeth as they rotate therepast. This arrangement is depicted in the exemplary embodiments of the above-referenced related patents.

The monopole sensor produces a voltage pulse as each target tooth crosses its path. Actually, a string of voltage pulses is produced over a period of time as the shafts rotate teeth past the sensor. The phase relation of these pulses is caused to shift as the drive shaft twists under load and moves its target teeth. Calculation of torque is made with a digital computer software program which correlates the measured twist or phase shift of the drive shaft with the magnitude of the torque being transmitted through the shaft. This correlation is based on the geometry of the shaft and its elastic modulus at a given temperature. Torque measurement accuracy is dependent upon both characteristics. However, temperature is measured and modulus is consistent from one shaft to another. Therefore, most variations in accuracy of torque measuring apparatus previously in use can be attributed to variations in shaft geometry (that is, wall thickness) from unit to unit in large production lots.

Conventionally, calibration of the torquemeter and shaft system has been made by a "zero" adjustment to the target teeth in a calibration rig, and a "slope" correction which groups shafts into three-to-five "classes" based on the amount of twist imparted to the shaft under a standardized load. In other words, a shaft which has been fabricated with walls machined to the thin side of a manufacturing tolerance will twist more for a given torque load than a shaft produced with walls to the thick side of that manufacturing tolerance. Therefore, the correlation characteristic used in the computer software will be different for the thin-walled class of shafts than for the thick-walled class of shafts. Current practice is to classify production shafts during calibration, and provide an adjustment to the calculation during assembly by means of a switch or resistor external to the digital computer. The drawback of this system is that the shaft and computer become a matched set of parts, and when one is removed and replaced, an adjustment is mandated.

As will be appreciated, the need to manually program the signal processing circuitry to compensate for a particular shaft in a particular installation not only imposes added administrative overhead to successful system operation, it also increases the chance that an erroneous signal compensation will in fact be effected if the manually entered compensation data is not properly coordinated with the actual shaft in a given installation. This includes situations where a different set of electronics may be associated with a given shaft during field installation and/or maintenance procedures.

A recent attempt to avoid the aforesaid difficulty of matching the shaft and computer is presented in U.S. Pat. No. 4,602,515 according to which torque measurement apparatus of this general type contains embedded data structures which can be used to provide automatic compensation for torque measurement errors induced by variations in gap, speed and shaft modulus among individual torque measuring systems. This modified apparatus may also conventionally provide temperature compensation.

According to this recent prior art development, differential tooth height, that is, the radial tooth dimension, is used to encode shaft modulus data while simultaneously providing a differential amplitude modulation component related to gap size. Since signal components related to speed are also inherently present, and since the differential pulse amplitude corresponds to the encoded shaft modulus data, the signal processing circuitry of the exemplary torque meter is also enabled to automatically compensate for errors induced by gap size between adjacent teeth, speed and shaft modulus for any given system.

Since the shaft modulus data unique to a given shaft is permanently and physically embedded within the toothed wheels at the time of manufacture, such automatic shaft modulus compensation will necessarily be correctly entered into any appropriate signal processing circuitry connected thereto in the field during installation and/or maintenance procedures. Of course, to achieve this desired result, it is necessary to use some form of "intelligent" signal processor such as a programmed microproccesor.

A significant drawback of this system, however, resides in the fact that each individual shaft must be modified in a specialized manner which differentiates it from each other shaft.

SUMMARY OF THE INVENTION

It was with knowledge of the prior art and the problems still existing that the present invention was conceived and has now been reduced to practice. Thus, the invention relates to a universal torque measuring system for hollow drive shafts which automatically compensates for variations in wall thickness exhibited by different drive shafts having the same nominal dimensions. Each drive shaft has a plurality of first target teeth thereon at spaced peripheral locations. An elongated reference shaft coaxial with the drive shaft has a plurality of second target teeth thereon corresponding to the first target teeth. During a calibration procedure, the drive shaft is subjected to a first predetermined torque which causes a certain amount of twist dependent upon its wall thickness. Simultaneously, the reference shaft is affixed to the drive shaft such that the second target teeth are angularly displaced from the first target teeth to produce an initial phase shift. Alternatively, the first target teeth are set in position during calibration, with the reference shaft geometry being held fixed.

Thereafter, when the shaft is incorporated into an engine and rotated under load subjecting it to a second predetermined torque less than the first predetermined torque, there is a resulting second phase shift. This second phase shift and the second predetermined torque define a second operating condition of the drive shaft. In turn, the first and second operating conditions define a characteristic relationship between torque and phase shift for the drive shaft. A sensor is positioned to detect deviations in phase shift of the first and second target teeth from the initial phase shift and generates a signal proportional to such deviations. A microprocessor is responsive to the signal from the sensor for automatically deriving a value of torque being experienced by the drive shaft as a function of each such deviation according to the characteristic relationship.

In short, a routine has been devised to eliminate any component matching or manual adjustment in the monopole torque meter system without sacrificing system accuracy. The new routine uses conventional "zeroing" of the torque meter in the calibration rig, although the adjustment is made at a standardized load value on the high end of the torque scale, rather than at zero torque. All shafts produced are "zeroed" at one value in this manner.

Furthermore, slope measurements or corrections are not made manually, as heretofore. Instead, the microprocessor used for torque calculation, is programmed also to "read" the phase relationship from the sensor during engine running at a known low-torque condition. The read value, after a simple validity check, is stored in computer memory, and used as a second point in defining the phase-torque characteristic for that shaft. In this manner, the torquemeter system performs a self-calibration each time it reads the low torque phase shift. The known low torque value can be defined with acceptable accuracy for a given type of powerplant, knowing other dependent characteristics, for example, core speed, output speed, load application control position, day temperature and shaft temperature. During the "read" function, these other characteristics are measured exactly. The validity of the read signal can be established by comparing the current value to a stored average of the last five values, or some other suitable reasonableness check can be performed. If the current sample is not acceptable, an error warning can be made by the computer, and the last reasonable value recorded can be used.

Other and further features, objects, advantages, and benefits of the invention will become apparent from the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

DESCRIPTION OF THE PREFERRED EMBODIMENT

Figure 1:
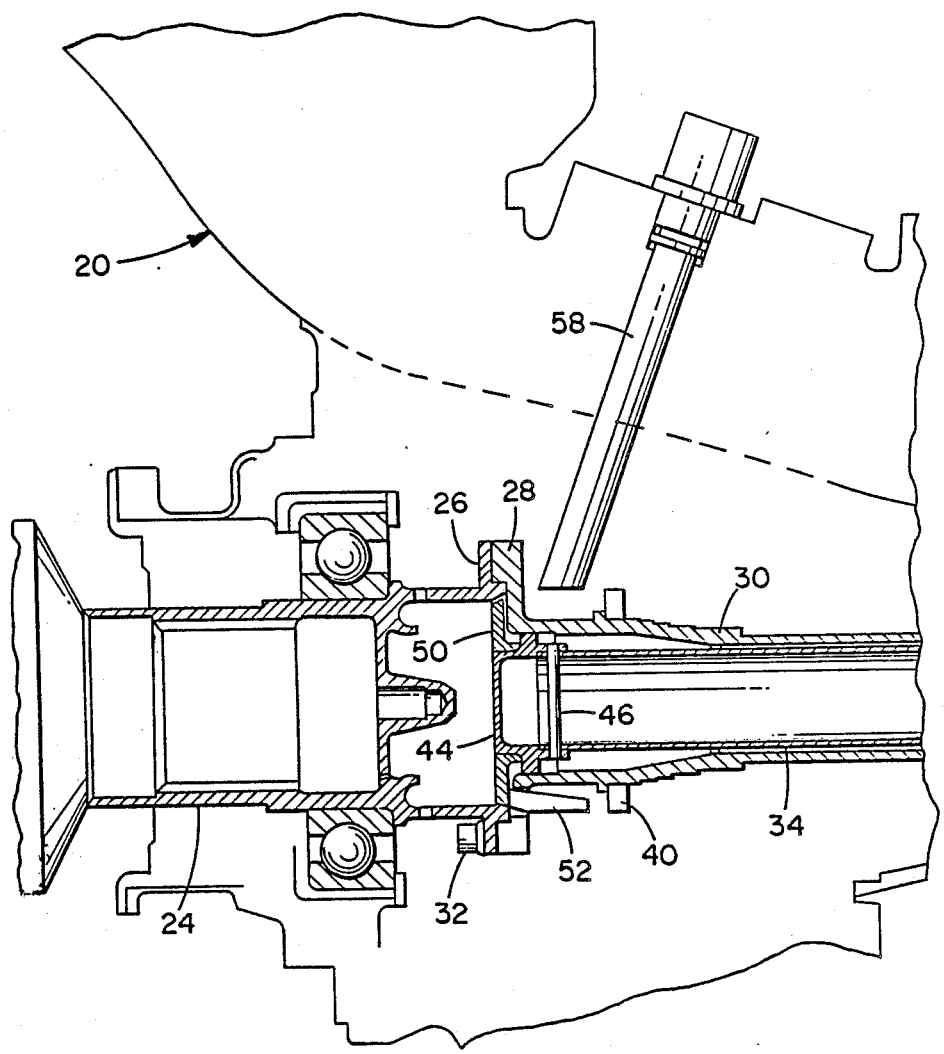
FIG. 1 is a detail side elevation view, certain parts cut away and shown in section, of a gas turbine engine which incorporates a drive shaft embodying the present invention.

Turn now to the drawings and initially to FIG. 1 which illustrates portions of a gas turbine engine 20 which utilizes a universal torque measuring system in accordance with the invention. While the engine 20 is illustrated as being a gas turbine engine, indeed, it may be any form of prime mover. That is, the benefits and advantages of the invention are of a universal nature and need not be restricted to gas turbine engines.

Returning now to FIG. 1, in customary fashion the gas turbine engine 20 has a turbine at the aft end (not shown) with a drive shaft 30. A mounting flange 28 at an extreme end of the drive shaft 30 is attached to a similar mounting flange 26 provided at an extreme end of an output shaft 24 and the flanges 26, 28 are firmly joined by means of a plurality of mounting bolts 32 such that the shafts 24 and 30 are aligned and coaxial. When the engine 20 is in operation, it is desirable and even necessary for the operator of the engine, or the pilot in the event the engine powers an aircraft, to know the magnitude of the torque being transmitted by the drive shaft 30 at all times.

It is conventional practice, before incorporating the drive shaft 30 into the engine 20 to perform a calibration operation on the shaft. This calibration operation is performed in order to make compensation between thin walled shafts and thick walled shafts since, as previously mentioned, thin walled shafts are caused to twist to a greater extent under a given torque load than are thick walled shafts. However, also as previously mentioned, the calibration operation performed in accordance with the invention does not require the use of any additional component separate from the drive shaft which must accompany it in transit from a fabrication location to a location at which it is being installed into a particular engine. Nor does the drive shaft require any specialized machining procedures of the type noted with respect to U.S. Pat. No. 4,602,515.

Figure 2:
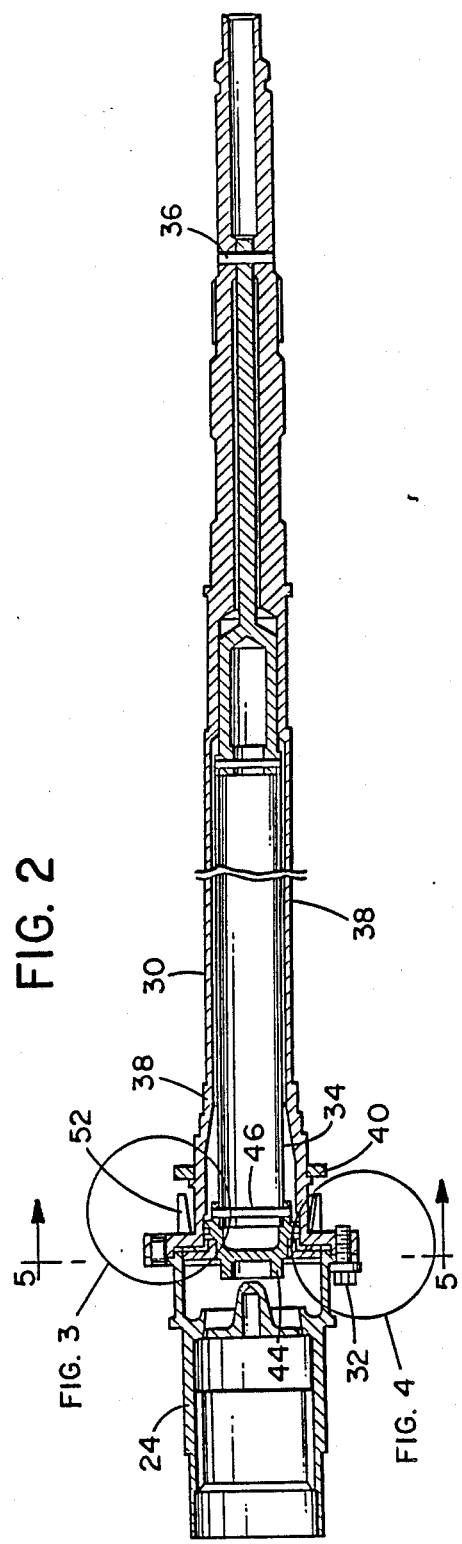
FIG. 2 is a longitudinal cross section view of the novel drive shaft illustrated in FIG. 1.
Figure 4:
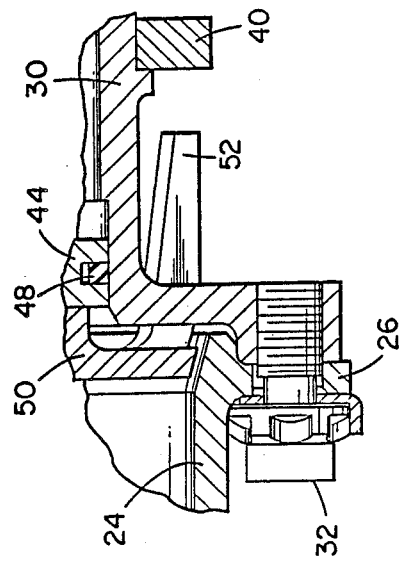
FIGS. 3 and 4 are detail cross section views of components illustrated in FIG. 2.
Figure 3:
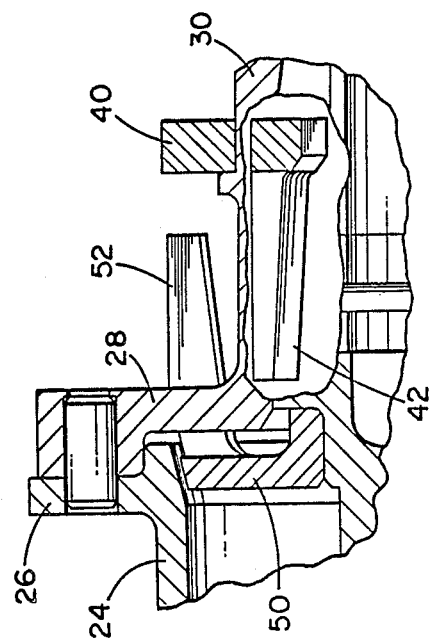

Before describing the calibration procedure, it is desirable first to describe the physical construction of the invention. For this purpose, turn to FIG. 2, which more clearly illustrates the drive shaft 30 as it extends away from the output shaft 24. As seen in FIG. 2, a reference shaft 34 which may be solid or hollow, as desired, is fixed to the drive shaft 30 at a location distant from the flange 28 by means of a pin 36. The outer diameter of the reference shaft 34 is slightly smaller than the inner diameter of the drive shaft 30. While the shafts 30 and 34 do not rotate relative to one another to any appreciable extent, they are separated by means of a plurality of annular spacers 38 which may, for example, be formed by plasma plating on the outer surface of the reference shaft. Thus, it will be apparent that the drive shaft 30 and the reference shaft 34 are maintained in substantially coaxial alignment, and the reference shaft 34 floats freely relative to the drive shaft 30 in the region proximate to the output shaft 24.

A reference ring 40 (see FIGS. 1-4) is mounted on and fixed to the drive shaft 30 by means of welding or in some other suitable fashion at a location longitudinally spaced from the mounting flange 28. A plurality of target teeth 42 integral with the reference ring 40 extend away from the ring in a direction toward the flange 28. The target teeth are preferably, although not necessarily, equally spaced peripherally on the reference ring and extend in directions which are substantially parallel to the longitudinal axis of the drive shaft.

Figure 5:
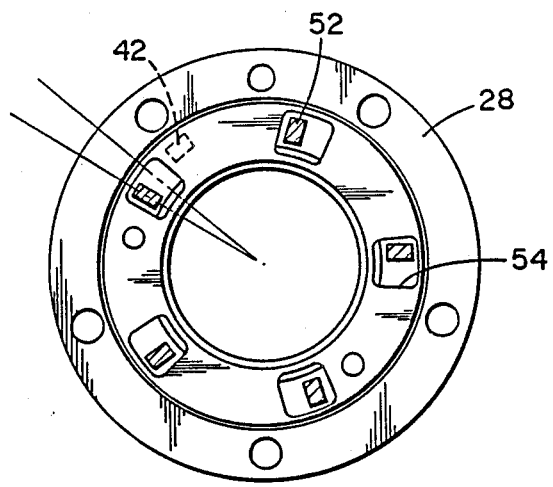
FIG. 5 is a cross section view taken generally along line 5—5 in FIG. 2.
Figure 6:
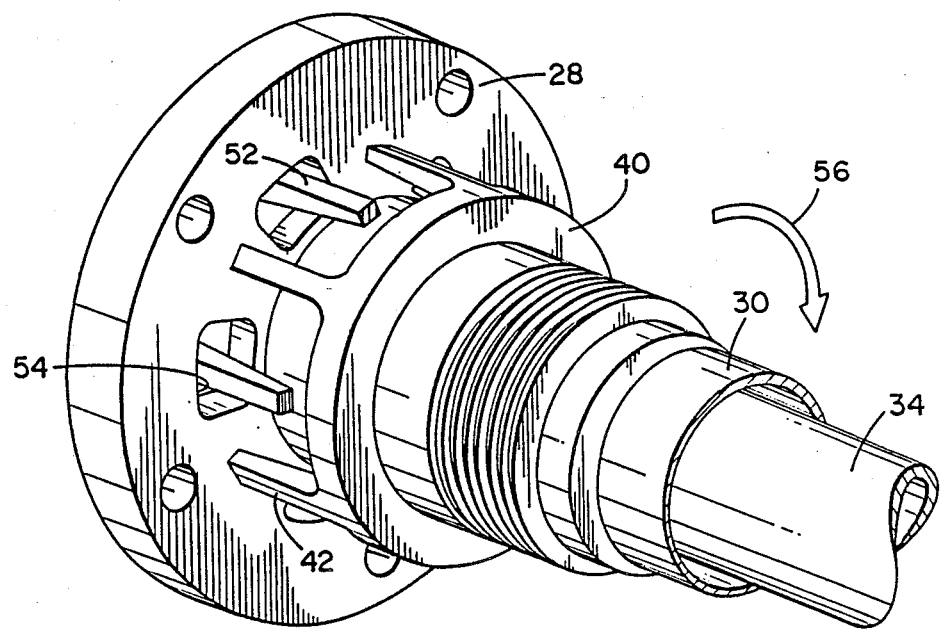
FIG. 6 is a detail perspective view illustrating parts shown in FIGS. 1-5.

At the end of the reference shaft 34, a cap 44 is fixed to the shaft 34 by means of a pin 46. An O-ring seal 48 (FIG. 4) is supported by the cap 44 and engages the inner surface of the drive shaft 30 and serves to prevent undesirable entry of contaminants into the region between the shafts 30 and 34. A second reference ring 50 (FIGS. 1, 3, and 4) is suitably fixed onto the cap 44 and includes a plurality of target teeth 52 which extend toward the first reference ring 40 through circumferentially spaced windows 54 in the mounting flange 28 (see FIGS. 5 and 6). The target teeth 52 are preferably, although not necessarily, located at equally spaced circumferential locations and extend in a direction generally parallel to their associated target teeth 42 and to the longitudinal axis of the drive shaft 30. The target teeth 52 are positioned proximate to and in an interdigitated relationship with the target teeth 42. Furthermore, the target teeth 52 correspond with the target teeth 42 such that, whatever the spacing between adjacent teeth of a reference ring, the spacing between the teeth 52 is consistent with the spacing between the teeth 42. Also, the windows 54 are sufficiently large to accommodate such circumferential movement of the teeth 52 relative to the flange 28 as is likely to occur when torque is applied to the drive shaft 30.

In conventional practice, the reference ring 50 would be so mounted on the cap 44 that the initial spacing between the target teeth 52 and the target teeth 42 would be equal or, at least, they would be spaced a predetermined distance apart when the drive shaft 30 has no torque applied to it. Subsequently, with the application of torque, as represented by an arrow 56 (FIG. 6), twist in the shaft 30 causes the target teeth 42 to move circumferentially relative to the target teeth 52. A suitable sensor 58, which may be of the monopole type or of any other suitable construction, is positioned proximate to the target teeth 42 and 52 and produces a voltage pulse, or a train of pulses, as each target tooth passes the sensor over a period of time. This would occur either in the even the drive shaft 30 is rotated about its longitudinal axis, or the sensor 58 is caused to rotate around the shaft 30, also about its longitudinal axis.

Figure 7:
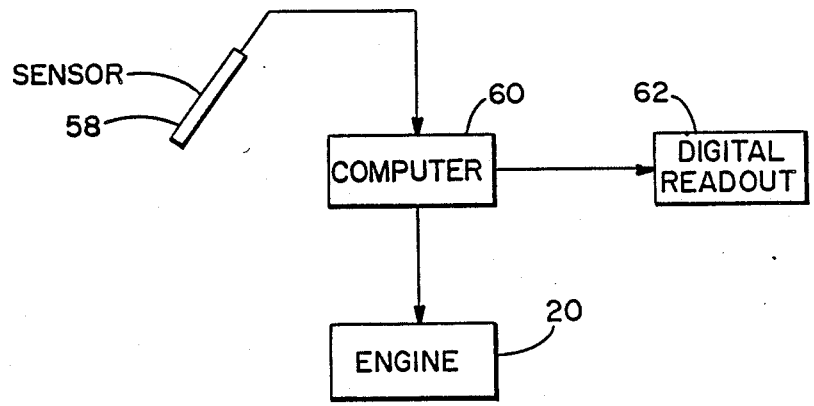
FIG. 7 is a schematic block diagram illustrating important components of the invention.

Calculation of torque is achieved by means of a suitable computer 60 employing a software program which correlates the measured twist of the drive shaft 30 with the torque being transmitted by the drive shaft to provide a digital readout 62. Such a system is schematically illustrated in FIG. 7.

Figure 8:
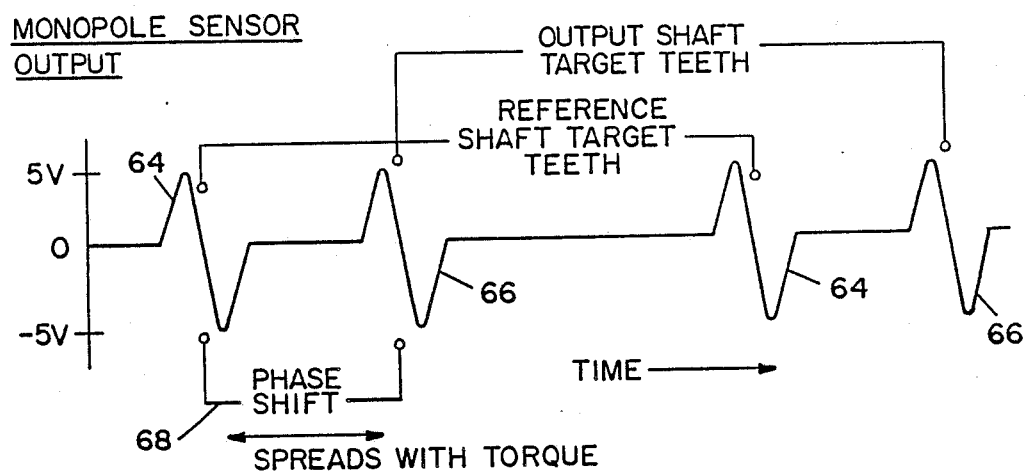
FIG. 8 illustrates the output of a sensor which is utilized with the invention.

As seen in FIG. 8, a voltage pulse 64 occurs each time a target tooth 42 passes the sensor 58. In a similar fashion, a voltage pulse 66 occurs each time a target tooth 52 passes the sensor 58. Indeed, a continuous train of pulses occurs with continued rotation of the drive shaft. Because of the spacing between adjacent target teeth 42, 52, there is a resulting phase shift 68. This phase shift changes as the drive shaft 30 twists and therefore causes relative movement of the target teeth 52 relative to the target teeth 42.

Figure 9:
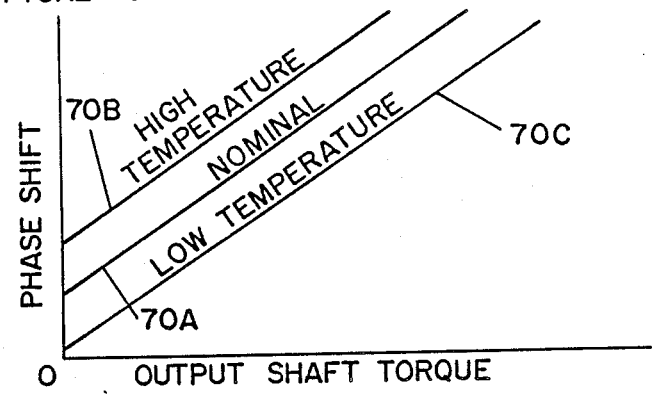
FIGS. 9, 10, and 11 are graphs indicating phase shift as a function of torque and utilized to explain the invention, FIG. 11 being representative of the invention.

In a conventional system, and also in the system of the present invention, the calculation of torque being transmitted by the drive shaft 30 is based on the geometry of the shaft and on the elastic modulus at a given temperature. FIG. 9 is a chart which is illustrative of phase shift occurring as a function of torque transmitted by the drive shaft in which the only variable is temperature. In this figure, a curve 70A represents a situation in which the drive shaft 30 is subjected to a nominal or ambient temperature (that is an "ambient temperature shaft"), curve 70B represents a high temperature shaft, and 70C represents a low temperature shaft. It was previously explained, however, that torque measurement accuracy is dependent on both geometry of the shaft and elastic modulus at a given temperature. The temperature is measured and the computer 60 so informed. Modulus is substantially consistent from unit to unit and, again, the computer 60 is so informed. Accordingly, most variations and therefore accuracy of a torque measuring system can be attributed to variations in shaft geometry from unit to unit in large production lots.

Figure 10:
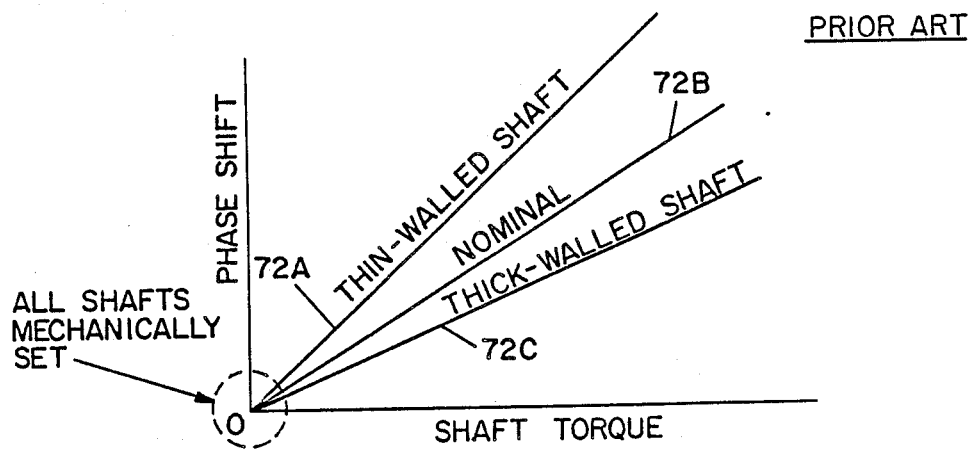

It was also previously explained that conventional calibration is performed by making a "zero" adjustment to the target teeth in a calibration rig (not shown). Such a conventional calibration is illustrated by the graph presented in FIG. 10 which, like FIG. 9, is a plot of phase shift as a function of shaft torque. As seen in FIG. 10, there is zero phase shift when the drive shaft 30 is unloaded. In contrast, as a thin walled shaft, represented by a curve 72A, is loaded, its phase shift changes to a much larger extent than that of a nominal shaft as represented by a curve 72B. In a reverse manner, the phase shift resulting from a thick walled shaft with ever increasing torque being applied to it, as indicated by a curve 72C, is less than that experienced by the nominal shaft.

As previously noted, this situation required production shafts to be classified during calibration and the necessary provision of an adjustment to the calculation during assembly by means of a switch or resistor external to the computer and external to the shaft which would have to accompany the shaft between its fabrication site and its final assembly site. This prior requirement of matching an electronic component to the shaft and requiring both to travel together, leaves room for human error and, therefore, is undesirable.

However, according to the invention, a different, and simplified, procedure is utilized. According to this improved procedure, when the drive shaft 30 is in its calibration rig (not shown), a torque is applied to the drive shaft 30 as symbolized by the arrow 56 in FIG. 6. The amount of torque applied to the drive shaft is predetermined and is the same or all shafts which are to use the system of the invention. While this magnitude of torque continues to be applied to the shaft 30, the reference ring 40 which had previously been free of the drive shaft 30 is then suitably fixed to the shaft, as by welding, such that a predetermined initial phase shift 68 is achieved between the target teeth 42 and 52. It will be appreciated that the predetermined torque, if applied to a thin walled shaft will cause a greater phase shift than if applied to a thick walled shaft. Subsequent to this operation, the drive shaft 30 and reference shaft 34, in combination, are unloaded and removed from the calibration rig, then assembled into the engine 20 in the manner illustrated in FIG. 1.

Figure 11:
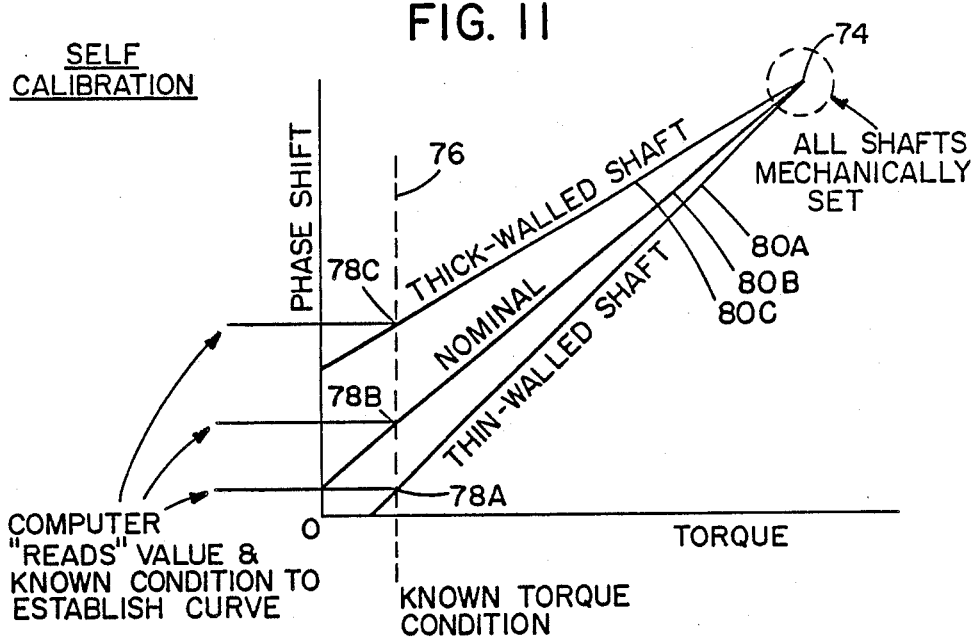

At this stage, it is desirable to view FIG. 11 which is contrasted with FIG. 10 but similarly graphically depicts phase shift as a function of shaft torque. Whereas FIG. 10 is representative of the prior art, FIG. 11 is representative of the present invention. Accordingly, as seen in FIG. 11, a first operative condition 74 which is the same for all drive shafts constructed in accordance with the invention is defined by the first predetermined torque which was applied to the drive shaft 30 during calibration and resulted in the first predetermined phase shift 68 between the target teeth 42 and 52, the relative positioning at which the reference ring 40 was fixed to the drive shaft 30 when the drive shaft 30 was so loaded.

It is also noteworthy that the computer may be of the type referred to as "FADEC" (Full Authority Digital Electronic Control), one suitable unit for purposes of the invention being Model LHS-100 manufactured by Lucas Aerospace, Inc. of Fairfield, N.J. While this computer is only one suitable example, whatever computer is actually used must be capable of knowing when the engine 20 is operating at a typical low torque condition as occurs, for example, when the engine is idling. The sensor 58 is effective to inform the computer 60 of a second phase shift which occurs when the engine operates at this condition. Viewing FIG. 11, the phase shift resulting from the idling condition enables the computer to define a second operating condition 78A for a thin walled shaft. Similarly, operating conditions 78B for a nominal shaft and 78C for a thick walled shaft are also illustrated in FIG. 11.

By joining the first, and always fixed, operating condition 74 to the second operating condition, 78A, 78B, 78C or any intermediate condition, depending upon the wall thickness of particular shaft being considered, curves can be drawn, numbered 80A, 80B, 80C or representative of any intermediate condition for each such shaft. This resulting curve represents a characteristic relationship between torque and phase shift for that particular shaft. As a result, as the engine 20 is operated and torque is applied to the shaft 30, as seen in FIG. 1, the sensor 58 is effective to detect the phase shift 68 occurring at any particular time and, using that information, the computer 60 is effective to determine the torque existing at that moment and display it visually by means of the readout 62.

While a preferred embodiment of the invention has been disclosed in detail, it should be understood by those skilled in the art that various other modifications may be made to the illustrated embodiment without departing from the scope of the invention as described in the specification and defined in the appended claims. For example, while the drive shaft 30 has been described as being hollow so as to receive the reference shaft therein, it would be within the scope of the invention for the reference shaft to overlie the drive shaft in a coaxial relationship, whether the drive shaft is solid or hollow.

What is claimed is:

1. A universal torque measuring system for hollow drive shafts which automatically compensates for variations in wall thickness exhibited by different drive shafts having the same nominal dimensions comprising:

a hollow drive shaft having a longitudinal axis and a plurality of first indicia thereon at spaced peripheral locations;

an elongated reference shaft coaxial with said drive shaft and having a plurality of second indicia thereon at spaced peripheral locations and proximately disposed relative to said first indicia, said reference shaft being fixed to said drive shaft at a location distant from said first and second indicia such that relative angular displacement of said first and second indicia about said longitudinal axis without regard to the wall thickness of said drive shaft when said drive shaft is subjected to a first predetermined torque produces an initial phase shift, said initial phase shift and said first predetermined torque defining a first operating condition, a second phase shift resulting when said drive shaft is subjected to a second predetermined torque, said second phase shift and said second predetermined torque defining a second operating condition of said drive shaft, said first and second operating conditions defining a characteristic relationship between torque and phase shift for said drive shaft;

sensor means for detecting deviations from said initial phase shift as said drive shaft is rotated under load and operable to generate a signal proportional to each such deviation; and signal processing means responsive to said signals from said sensor means for automatically deriving a value of torque being experienced by said drive shaft as a function of each such deviation according to said characteristic relationship.

2. A universal torque measuring system as set forth in claim 1 wherein said first and second indicia are equal in number and are equally spaced peripherally about said drive shaft and said reference shaft, respectively.

3. A universal torque measuring system as set forth in claim 2 wherein said drive shaft is coupled to the turbine of a gas turbine engine; and wherein said second predetermined magnitude of torque is the torque experienced by said drive shaft under idle conditions of the gas turbine engine.

4. A universal torque measuring system as set forth in claim 1 wherein said deviation is relatively large when said drive shaft has less than a nominal wall thickness; and wherein said deviation is relatively small when said drive shaft has greater than a nominal wall thickness.

5. A universal torque measuring system as set forth in claim 1 wherein said drive shaft has a terminal end;

wherein said first indicia include:

a plurality of circumferentially spaced first target teeth fixed on said drive shaft at locations proximate to said terminal end;

wherein said reference shaft is fixed to said drive shaft at a location distant from said terminal end; and wherein said second indicia include a plurality of circumferentially spaced second target teeth fixed thereon corresponding to said first target teeth.

6. A universal torque measuring system as set forth in claim 1 wherein said drive shaft includes:

an annular flange at a terminal end with circumferentially spaced windows therein;

wherein said first indicia include:

a plurality of circumferentially spaced first target teeth fixed on said drive shaft at locations spaced from said annular flange; and wherein said reference shaft is fixed to said drive shaft at a locations distant from said terminal end; and wherein said second indicia include:

a plurality of circumferentially spaced second target teeth fixed thereon corresponding to said first target teeth and extending through associated windows in said annular flange.

7. A universal torque measuring system as set forth in claim 6 wherein said first target teeth are fixed on said drive shaft at equally spaced circumferential locations; and wherein said second target teeth are fixed on said reference shaft at equally spaced circumferential locations.

8. A universal torque measuring system as set forth in claim 6 wherein said first and second target teeth are elongated and extend in directions generally parallel to said longitudinal axis of said drive shaft, said first and second teeth being relatively interdigitated.

9. A universal torque measuring system as set forth in claim 8 wherein said annular flange lies in a plane substantially perpendicular to said longitudinal axis.

10. A universal torque measuring system as set forth in claim 1 wherein the application of said second predetermined torque to a drive shaft which exhibits less than a nominal wall thickness results in a relatively large deviation; and wherein the application of said second predetermined value of torque to a drive shaft which exhibits greater than a nominal wall thickness results in a relatively small deviation.

11. In combination with a power plant having an output shaft, a universal torque measuring system for hollow drive shafts which automatically compensates variations in wall thickness exhibited by different drive shafts having the same nominal dimensions comprising:

a hollow drive shaft coupled to said output shaft and having a longitudinal axis and a plurality of first indicia thereon at spaced peripheral locations;

an elongated reference shaft coaxial with said drive shaft and having a plurality of second indicia thereon at spaced peripheral locations and proximately disposed relative to said first indicia, said reference shaft being fixed to said drive shaft at a location distant from said first and second indicia such that relative angular displacement of said first and second indicia about said longitudinal axis without regard to the wall thickness of said drive shaft when said drive shaft is subjected to a first predetermined torque produces an initial phase shift, said initial phase shift and said first predetermined torque defining a first operating condition, a second phase shift and said second predetermined torque defining a second operating condition of said drive shaft, said first and second operating conditions defining a characteristic relationship between torque and phase shift for said drive shaft;

sensor means for detecting deviations from said initial phase shift as said drive shaft is rotated under load and operable to generate a signal proportional to each such deviation; and signal processing means responsive to said signals from said sensor means for automatically deriving an operating value of torque different from said first predetermined torque being experienced by said drive shaft as a function of each such deviation according to said characteristic relationship.

12. A universal torque measuring system as set forth in claim 11 wherein said signal processing means includes means for determining said operating value of torque.

13. A universal torque measuring system as set forth in claim 12 wherein said operating value of torque is the torque experienced by the drive shaft under idle conditions of said power plant.

14. A universal torque measuring system as set forth in claim 11 wherein said drive shaft has a terminal end;

wherein said first indicia include:

a plurality of circumferentially spaced first target teeth fixed on said drive shaft at locations spaced from said terminal end;

wherein said reference shaft is fixed to said drive shaft at a location distant from said terminal end; and wherein said second indicia include a plurality of circumferentially spaced second target teeth fixed thereon corresponding to said first target teeth.

15. A universal torque measuring system as set forth in claim 11 wherein said drive shaft includes:

an annular flange at a terminal end with circumferentially spaced windows therein;

wherein said first indicia include:

a plurality of circumferentially spaced first target teeth fixed on said drive shaft at locations spaced from said annular flange; and wherein said reference shaft is fixed to said drive shaft at a locations distant from said terminal end; and wherein said second indicia include:

a plurality of circumferentially spaced second target teeth fixed thereon corresponding to said first target teeth and extending through associated windows in said annular flange.

16. A universal torque measuring system as set forth in claim 15
   wherein said first target teeth are fixed on said drive shaft at equally spaced circumferential locations; and
   wherein said second target teeth are fixed on said reference shaft at equally spaced circumferential locations.

17. A universal torque measuring system a set forth in claim 15
   wherein said first and second target teeth are elongated and extend in directions generally parallel to said longitudinal axis of said drive shaft, said first and second teeth being relatively interdigitated.

18. A universal torque measuring system as set forth in claim 17
   wherein said annular flange lies in a plane substantially perpendicular to said longitudinal axis.

19. A universal torque measuring system as set forth in claim 11
   wherein said power plant is a gas turbine engine including a turbine wheel; and
   wherein said drive shaft is driven by said turbine wheel.

20. A universal method of measuring torque sustained by hollow drive shafts which automatically compensates for variations in wall thickness exhibited by different drive shafts having the same nominal dimensions comprising the steps of:
   providing first indicia on a hollow drive shaft at spaced peripheral locations;
   providing second indicia on a reference shaft coaxial with the drive shaft and fixed to the drive shaft distant from an end thereof, the second indicia being proximately disposed relative to the first indicia;
   imparting a first predetermined torque to the drive shaft;
   simultaneous with the preceding step, angularly displacing about the longitudinal axis of the drive shaft the first indicia relative to the second indicia to cause an initial phase shift therebetween;
   simultaneous with the preceding two steps, angularly positioning and affixing the first indicia to the drive shaft such that the initial phase shift and the first predetermined torque define a first operating condition;
   imparting to the drive shaft a second predetermined torque less than the first predetermined torque thereby causing a second phase shift between the first and second indicia, the second phase shift and the second predetermined torque defining a second operating condition;
   rotating the drive shaft;
   sensing deviations from the initial phase shift as the drive shaft is rotated;
   generating a signal proportional to each such deviation; and
   processing the signals to automatically derive a value of torque being experienced by the drive shaft as a function of each such deviation according to a characteristic relationship for the drive shaft as defined by the first and second operating conditions.

* * * * *